United States Patent
Klüter

(10) Patent No.: US 6,867,847 B2
(45) Date of Patent: Mar. 15, 2005

(54) APPARATUS AND METHOD FOR PROJECTING GRAPHIC INFORMATION ONTO A LIGHT-SENSITIVE MATERIAL

(75) Inventor: Ulrich Klüter, München (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/615,487

(22) Filed: Jul. 7, 2003

(65) Prior Publication Data

US 2004/0135982 A1 Jul. 15, 2004

(30) Foreign Application Priority Data

Jul. 11, 2002 (EP) .............................................. 02015424

(51) Int. Cl.⁷ .......................... G03B 27/54; G03B 27/42
(52) U.S. Cl. .......................................... 355/67; 355/53
(58) Field of Search ........................ 355/53, 55, 67–71; 359/224, 855; 250/492.2

(56) References Cited

U.S. PATENT DOCUMENTS

| | | | | |
|---|---|---|---|---|
| 5,994,006 A | * | 11/1999 | Nishi | ........................... 430/22 |
| 6,473,237 B2 | * | 10/2002 | Mei | ........................... 359/619 |
| 6,606,739 B2 | * | 8/2003 | Kanatake et al. | .............. 716/21 |
| 6,624,880 B2 | * | 9/2003 | Sandstrom et al. | ........... 355/71 |
| 6,717,651 B2 | * | 4/2004 | Kato et al. | ..................... 355/55 |
| 2002/0080226 A1 | | 6/2002 | Johnson | |
| 2002/0171816 A1 | * | 11/2002 | Markle | ........................ 355/67 |

FOREIGN PATENT DOCUMENTS

| | | |
|---|---|---|
| EP | 0 867 745 A2 | 9/1998 |
| EP | 0 987 875 A1 | 3/2000 |
| EP | 1 003 071 A2 | 5/2000 |
| EP | 1 202 111 A2 | 5/2002 |
| EP | 0 987 875 B1 | 8/2002 |

* cited by examiner

Primary Examiner—Henry Hung Nguyen
(74) Attorney, Agent, or Firm—Darby & Darby

(57) ABSTRACT

In an apparatus for producing images on a light-sensitive material, the graphic information content for an image that is to be projected onto the light-sensitive material is divided into individual pixels. The projected image is composed of mutually offset partial images that are represented in a transmissive device consisting of an array of transmissive elements. The apparatus includes a light source that generates light rays passing through the transmissive device, an illumination device that bundles the light rays into light beams before they pass through the transmissive device, and a projection objective that projects the light beams telecentrically onto the light-sensitive material.

17 Claims, 2 Drawing Sheets

APPARATUS AND METHOD FOR PROJECTING GRAPHIC INFORMATION ONTO A LIGHT-SENSITIVE MATERIAL

BACKGROUND OF THE INVENTION

The invention relates to an apparatus and method for projecting graphic information that is divided into individual pixels onto a light-sensitive material, wherein the projected image is composed of mutually offset partial images that are represented in a transmissive device consisting of an array of transmissive elements. The apparatus includes a light source generating light rays that pass through the transmissive device in which one of the partial images is represented, and it further includes an illumination device for guiding the light rays into a plurality of beam paths extending parallel to one another through the transmissive elements, as well as a projection objective for projecting the light rays representing the partial images onto the light-sensitive material.

At the present time, the process of producing images on a light-sensitive material is performed predominantly by devices that are based on a digital operating principle. In these digitally operating devices, the graphic information to be represented in the image is divided into individual pixels that are projected onto the light-sensitive material. The individual pixels are generated by a transmissive device that is formed by a plurality of individually controllable transmissive elements, such as an LCD (liquid crystal device), a DMD (digital mirror device), or another appropriate light modulator. The transmissive elements are controlled in accordance with the graphic information that is to be represented in the image. The representation of a partial image formed by the controllable elements of the transmissive device is converted by means of an illumination device into a plurality of light rays that run along parallel beam paths and are focused by the projection objective to produce the partial image on the light-sensitive material.

The resolution of such transmissive devices depends on the number of elements, which must be addressed individually, and this number usually is not sufficient to produce a high-resolution image in photographic quality on the light-sensitive material. Therefore, as a way to increase the resolution, several partial images are produced sequentially by the transmissive device and projected onto the image plane of the light-sensitive material mutually offset to one another. For each partial image, a mask disposed in front of the transmissive device covers a section of each of the individually controllable transmissive elements, so that the partial image is formed as a raster grid of individual exposed areas that are spaced apart from one another. In order to increase the resolution, for example by a factor of four, a corresponding number of mutually offset partial images are projected onto the light-sensitive material.

A method based on the foregoing principle and a device for carrying out the method are disclosed in EP 0 987 875. According to the method described therein, the mutual offset of the partial images which are represented sequentially by the transmissive device and are projected onto the light sensitive material through an optical projection device is accomplished by means of a rotatable, inclined glass plate.

It is a disadvantage of these known devices and methods that the resolution of the image produced on the light-sensitive material depends on the number of surface segments exposed for producing each of the partial images on the light-sensitive material and, accordingly, on the size of the transmissive element sections that are not covered by the mask. If the image is to be produced on a comparatively large format of the light-sensitive material, the image resolution would be relatively coarse as a result of magnifying the image to the desired format. In other words, the raster pitch of the exposed surface elements or pixel areas of the image is magnified in the same proportion. Especially with large magnifications, the boundaries between the surface elements become fuzzy and there is overlapping of adjacent surface elements, which leads to a reduced quality and brilliance of the image. The resolution of the image can only be adapted to the format size of the light-sensitive material by exchanging the optical imaging device, the mask and the transmissive device.

OBJECT OF THE INVENTION

The invention therefore has the objective to propose an apparatus and a method for projecting an image onto a light-sensitive material in the form of partial images that are offset relative to one another, wherein the inventive apparatus or the use of the inventive method allows the image resolution to be easily adapted to a selected format size of the light-sensitive material on which the image is to be produced.

SUMMARY OF THE INVENTION

In an apparatus and method according to the invention, the graphic information that is to be projected onto a light-sensitive material is divided into individual pixels. The projected image is composed of mutually offset partial images that are represented in a transmissive device. The apparatus includes a light source generating light rays that pass through the transmissive device to produce the partial images, and it further includes an illumination device for guiding the light rays into a plurality of light paths extending parallel to one another through the transmissive device, as well as a projection objective for projecting the light rays representing the partial images onto the light-sensitive material. The illumination device bundles the light rays into light beams before they pass through the transmissive device, and the projection objective projects onto the light-sensitive material only those of the bundled light rays that run at least approximately parallel to the optical axis of the projection objective.

According to the invention, only those of the bundled light rays that run at least approximately parallel to the optical axis of the projection objective are allowed to reach the image plane of the light-sensitive material. As a result of this arrangement, only a portion of the light rays passing through each element of the transmissive device are projected onto the light-sensitive material, so that the surface segments that are to be exposed on the light-sensitive material and that make up a partial image have a defined size and are surrounded by a sharply bounded unexposed area. The projection objective, by virtue of its special optical properties, determines the size of each of the surface segments to be exposed which form the raster grid of the partial image on the light-sensitive material. Accordingly, the size of the surface segments on the light-sensitive material that are exposed to the light rays no longer depends on a mask covering a section of each of the elements of the transmissive device but is instead determined by the optical properties of the projection system. In order to keep the loss of light as small as possible, it is furthermore proposed according to the invention that the light rays be bundled into light beams by means of the illumination device before they pass through the transmissive device.

As a combined effect of bundling the light rays into beams and of allowing only those rays to reach the image plane that extend at least approximately parallel to the optical axis of the projection system, the surface segments to be exposed, which represent a partial image in the form of a raster grid, have a defined size. The image resolution of the inventive apparatus can be adjusted, for example in order to expose a large format size of light-sensitive material, by adjusting or exchanging the projection objective in order to increase or decrease the size of the surface segments of the light-sensitive material that are to be exposed and form part of the raster grid defining a partial image and by producing a commensurately lower or higher number of partial images.

The preferred choice for the projection system of the inventive apparatus is a telecentric objective. Telecentric objectives offer a simple solution to perform the functions described above, i.e., to allow only those light rays to reach the image plane of the light-sensitive material that run at least approximately parallel to the optical axis of the objective, and to allow the partial image to be magnified or reduced as needed to match the format size of the material to be exposed.

For the exposed surface segments of the light-sensitive material to have as sharply defined borders as possible, it is particularly advantageous to use a telecentric objective that allows only light rays with an aperture angle ranging between +7° and −7° to reach the image plane, where the aperture angle is measured relative to the optical axis of the telecentric objective. Particularly good results can be achieved with a telecentric objective that has an even smaller aperture angle ranging between +4.7° and −4.7°.

It is further proposed according to the invention to arrange at least one adjustable diaphragm between the light source and the transmissive device for producing partial images to adjust the width of the light cone radiated from the light source, and also to provide a lens arrangement, preferably a condenser, for collecting and projecting the light radiating from the light source through the adjustable diaphragm onto the transmissive device. By means of the adjustable diaphragm, the cone of light radiated from the light source can be adjusted so that the size of the surface elements on the light-sensitive material that are exposed to the projected light beams can be changed selectively. In this way, the size of the areas that are to be exposed and, accordingly, the total number of partial images that are to be produced on the light-sensitive material, can be adjusted so that the image resolution is matched to the format size of the light-sensitive material. Preferably, the adjustable diaphragm is connected with a control system that changes the aperture of the diaphragm in accordance with the selected format size. The light passing through the diaphragm is collected by means of a lens arrangement, preferably an optical condenser, and projected onto the transmissive device in order to use the light coming from the diaphragm as efficiently as possible.

Instead of the above-described arrangement of the diaphragm and lens arrangement, a two-dimensional LED array formed by a plurality of LEDs can also be used as light source. Only a small portion of the LEDs around the center of the LED array is switched on, so that the areas to be exposed on the light-sensitive material can be adjusted to a small size in order to achieve a particularly high resolution for the finished image. On the other hand, the whole of the LED array is switched on if the size of the exposure areas is to be increased, with a corresponding decrease in resolution of the finished image. With this concept, the adjustable diaphragm described above can be omitted. In order to project different colors on the light-sensitive material, it is furthermore of advantage to use an LED array with LED elements in different colors that are addressed separately, depending on which color is to be used for the exposure. Instead of this multi-colored LED array, it is also possible to use several LED arrays arranged side by side, each of which emits light of a different wavelength. The light of the different LED arrays can be directed by means of optical elements such as mirrors onto the LCD device.

In a particularly preferred embodiment of the inventive apparatus, the projection system for projecting the partial images onto the light-sensitive material includes at least one adjustable lens arrangement and/or at least one adjustable diaphragm arrangement for changing the size of the area that is to be covered on the light-sensitive material by each light beam. This makes it unnecessary to exchange any part of the projection objective, so that with the same optics different formats of the light-sensitive material can be exposed with different resolutions simply by adjusting the lens arrangement and/or the diaphragm arrangement.

In a particularly preferred embodiment of the inventive apparatus, the illumination device that is arranged between the light source and the transmissive device for producing partial images has a micro-lens matrix as well as a black matrix disposed between the micro-lens matrix and the transmissive device. The bond connections between the addressable elements of the transmissive device are covered by means of the black matrix, so that the light beams can only pass through a defined, specified section of each element. At the same time, the micro-lens matrix which is arranged in the light path ahead of the black matrix has the effect of focusing as much of the light from the light source as possible on the free surface area of each of the addressable elements and to minimize the light losses caused by the black matrix. Accordingly, a maximum light yield is achieved by the combined effect of the micro-lens matrix and the black matrix.

In a further preferred embodiment of the inventive apparatus, the illumination device and the transmissive device are constructed so that they can be moved together in a transverse plane to the optical axis of the projection system in order to effect the lateral offset of the partial images that are to be projected onto the light-sensitive material.

Alternatively or in addition, it is proposed to use an optical offsetting device to perform the function of shifting the projected partial images transversely to the optical axis of the imaging optics. The optical offsetting device provides a very accurate means of positioning the partial images on the light-sensitive material. In this arrangement, the optical offsetting device is disposed preferably between the projection system and the light-sensitive material. This is conducive to a relatively simple configuration of the inventive apparatus.

The optical offsetting device for shifting the projected partial images is preferably configured as two optical elements that can be moved relative to each other and are arranged following one another in the light path of the projection system. With the arrangement of two optical elements following one another in the light path it is possible to shift the partial images in any direction on the light-sensitive material. Furthermore, the raster grid of the surface elements that are to be exposed for each partial image can be shifted in any direction. With this type of optical device, it is of particular advantage if the optical elements can be tilted about two tilt axes that intersect the optical axis of the projection system and are oriented at right angles to each other.

Alternatively, the optical offsetting device can be configured as a glass plate that is rotatable about an axis that coincides with the optical axis of the projection system and is set at an angle to the optical axis of the imaging optics.

The invention further relates to a method of projecting graphic information that is divided into individual pixels onto a light-sensitive material, wherein the projected image is composed of mutually offset partial images. The method serves in particular to operate the inventive apparatus as well as the embodiments described above.

In a particularly preferred version of the inventive method, the size of the exposure areas, i.e., the size of the surface elements exposed to the individual light beams projected onto the light-sensitive material is adaptable to different format sizes of the light-sensitive material in such a manner that after the exposures of all of the partial images have been completed, there is at most a slight overlap between adjacent exposed surface element. This concept allows an optimum level of image resolution to be selected for each format of the light-sensitive material with the exposed areas lying contiguously adjacent to one another without overlapping, which results in a particularly high contrast in the finished images.

As a further proposed concept under the scope of the inventive method, the total number of partial images that are to be projected onto the light-sensitive material is selected as a function of the format size of the light-sensitive material, while the exposure areas of the surface elements that are covered by the light beams on the light-sensitive material are kept at an least approximately constant size for all formats of the light-sensitive material. This ensures that the same image resolution is set for each format, so that the same high image quality and brilliance that is possible with small print formats can also be attained in large-sized prints.

BRIEF DESCRIPTION OF THE DRAWINGS

Further distinguishing features and advantages of the invention may be learned from the following description of a preferred embodiment. The description refers to the attached drawings, wherein FIG. 1 schematically represents an apparatus according to the invention for projecting images onto a light-sensitive material consisting of a photographic paper.

DETAILED DESCRIPTION OF A PREFERRED EMBODIMENT

Figure 1:
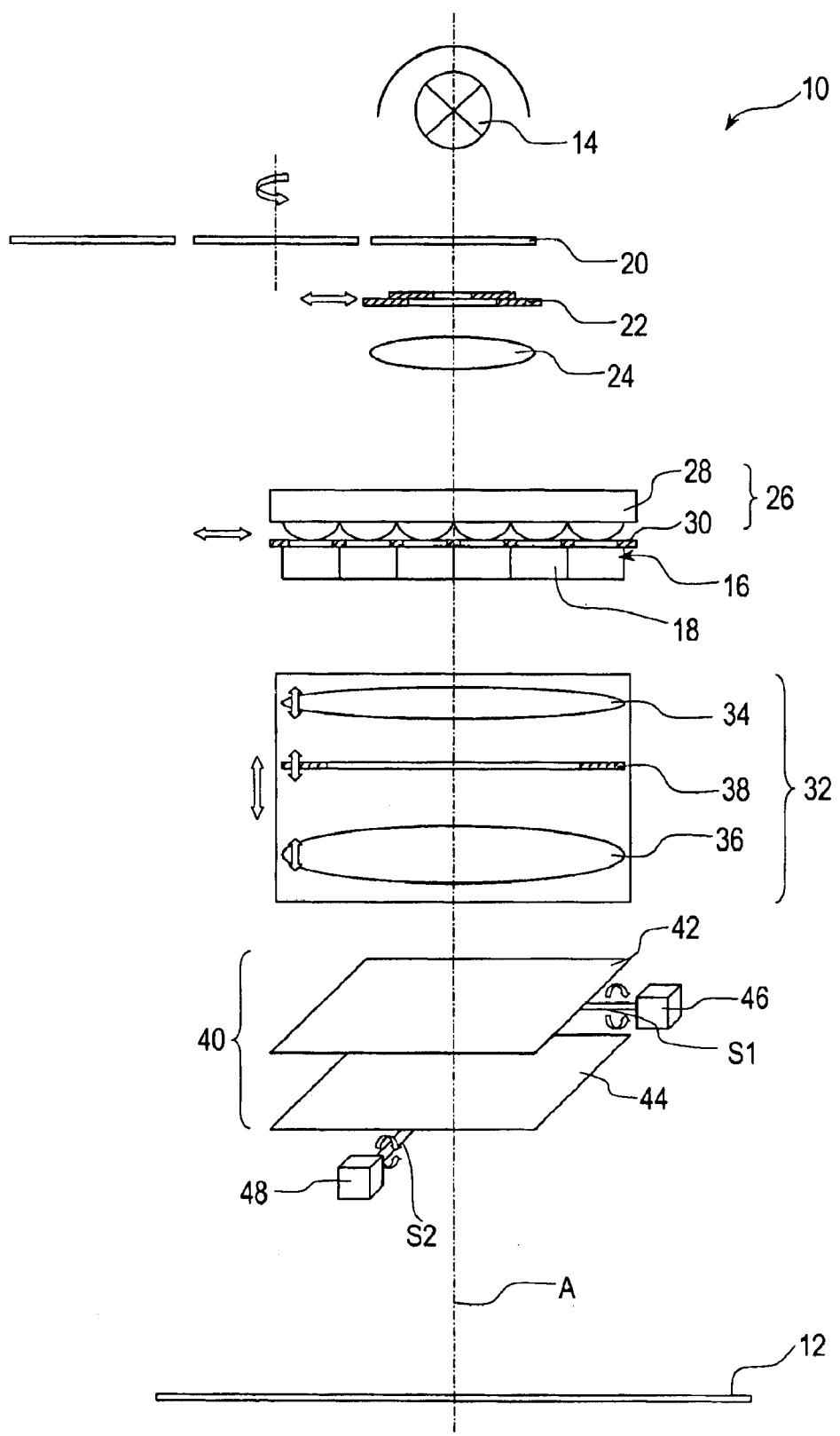

FIG. 1 schematically illustrates an apparatus 10 according to the invention which serves to project graphic information that is divided into individual pixels onto a light-sensitive material, in this case a photographic paper 12, in the form of mutually offset partial images.

The apparatus 10 has a light source 14 that serves to illuminate a transmissive LCD device 16. The LCD device 16 is composed of a plurality of transmissive LCD elements 18 that are arranged two-dimensionally next to each other and are addressed individually in accordance with image-specific digital image information by a control system that is not shown in the drawing.

A filter arrangement 20 composed of several different color filters is arranged between the light source 14 and the LCD device 16. The purpose of the filter arrangement will be discussed farther below.

Furthermore, a steplessly adjustable diaphragm 22 is followed by a condenser 24 in the light path between the filter arrangement 20 and the LCD device 16. The drawing is intended to show only the necessary components. The distances between the components are not true to scale. For example, the actual distance between the light source 14 and the diaphragm 22 is small compared to the distance between the diaphragm 22 and the condenser 24. The diaphragm 22 normally has a round opening. The cone of light radiated from the light source 14 is limited by means of the diaphragm 22 so that only light rays within a specified angle relative to the optical axis A of the device 10 are radiated onto the LCD device 16. The size of the diaphragm is selected so that the dispersion angle of the light beam passing through the diaphragm is as small as possible, i.e., the light rays of the beam are already as parallel as possible. The light passing through the diaphragm 22 is collected by means of the condenser 24 and concentrated onto the LCD device 16 in order to minimize light losses and to direct additional light rays onto the LCD device 16. The condenser 24 further improves the parallelism of the light rays, so that after passing through the condenser 24, the light should be substantially parallel to the optical axis A. The adjustable diaphragm 22 is preferably connected with the previously described control system which automatically adjusts the aperture of the diaphragm 22 based on a given format size of the light-sensitive material 12. It is also possible to configure the diaphragm 22 so that it can be adjusted stepwise and to correlate the different aperture steps directly to the selected formats of the light-sensitive material 12.

An illumination device 26 is arranged immediately adjacent to the LCD device 16 between the LCD device 16 and the filter arrangement 20. The illumination device 26 is composed of a micro-lens matrix 28 and a so-called black matrix 30. The black matrix 30 lies directly on top of the LCD device 16 and covers the bond connections of the LCD elements 18. A lens of the micro-lens matrix 28 is assigned to each LCD element 18 and positioned over the portion of the LCD element that is not covered up by the black matrix 30. The light rays that are emitted by the light source 14, colored by the currently set filter of the filter arrangement 20, admitted through the opening of the diaphragm, and aligned by the condenser are substantially parallel as they enter the micro-lens matrix 28. Each micro-lens of the micro-lens matrix 28 focuses the incident parallel light onto the individual LCD element 18 associated with that micro-lens. Thus, only the central ray through each LCD element 18 continues to run parallel to the optical axis A of the system, while the peripheral rays of each micro-lens are refracted (i.e., bent) towards the optical axis of the micro-lens. The farther away an incident light ray is from the central ray through a micro-lens, the larger will be its angle to the optical axis A after passing through the micro-lens.

A telecentric objective 32 that follows the LCD device 16 in the light path has the effect that it will only allow those light rays to pass through that do not exceed a given angular range relative to the optical axis, which is also referred to as the acceptance angle of the telecentric objective. In each of the light beams arriving from the individual micro-lenses, only those rays that are close to the axis of their respective micro lens fall within this acceptance range, and therefore only the central portion of each individual micro-lens beam is projected into the image plane by the telecentric objective 32.

If on the other hand, the light entering the micro-lens matrix 28 has a lesser degree of parallel alignment, the micro-lenses will also receive light rays directed at some angle to the axis of the respective micro-lens. Due to the lens refraction, some of the oblique incident rays within a certain range around the center will leave the lens as axis-parallel rays. As a result, a larger portion of the light passing through each micro-lens is projected into the image plane by the telecentric objective 32.

As a result, a raster grid of light points is produced in the image plane, with each of the light points being assigned to a particular LCD element 18 and surrounded by a non-lighted frame. By addressing the LCD elements 18 with appropriate electronic signals, a partial image of a set of graphic information can be produced in the image plane as a raster grid of light points.

Instead of the previously described combination of the filter arrangement 20 and the LCD device 16, it is also possible to use an LCD device in which not only the brightness but also the color of the LCD elements can be controlled so that the colors in the image can be generated by the LCD device.

A telecentric objective 32 is arranged to follow the LCD device 16 in the direction of the light path from the light source 14 to the image plane of the photographic paper 12. The telecentric objective 32 has two lens arrangements 34 and 36 with a diaphragm device 38 positioned between them.

The lens arrangements 34 and 36 as well as the diaphragm device 38 of the telecentric objective 32 are positioned relative to one another in such a way that only light rays in a maximum angular range between +4.7° and −4.7° relative to the optical axis A of the telecentric objective 32 are projected into the image plane by the telecentric objective 32. As a result, only a portion of each of the light beams that are directed by the optical illumination device 26 through the LCD device 16 is actually projected onto the photographic paper 12 to form a light point. Thus, the size of the light points that are projected onto the photographic paper 12 and that make up the raster of a partial image is set by the telecentric objective 32. The angular acceptance range of the telecentric objective 32 depends on the position and aperture width of the diaphragm 38.

The telecentric objective 32, the lens arrangements 34 and 36, as well as the diaphragm device 38 can be moved along the optical axis A in order to adjust the size of the light points as well as the overall format size of the image that is to be produced on the photographic paper 12. Moreover, it is also possible to adjust the width of the cone of light from the light source 14 by adjusting the diaphragm 22, whereby the size of the light points is likewise adjusted.

Further, an optical offsetting device 40 is arranged between the telecentric objective 32 and the photographic paper 12, so that each of the partial images produced by the LCD device 16 can be projected with a defined offset onto the photographic paper 12. The optical offsetting device 40 has two glass plates 42 and 44 that are coupled to respective servo drive mechanisms 46 and 48 which serve to rotate the glass plates 42 or 44 about their respective pivot axes S1 or S2 to set the plates at specified tilt angles. The pivot axes S1 and S2 of the two glass plates 42 and 44 extend at right angles to each other and also intersect the optical axis A of the telecentric objective 32 at a right angle.

The two glass plates 42 and 44 effect a defined parallel offset of the beam paths. The magnitude and direction of the offset depends on the respective tilt positions of the two glass plates 42 and 44. With the arrangement of the two glass plates, a partial image produced by the LCD device 16 and projected into the plane of the photographic paper 12 can be offset by any desired amount and in any desired direction. The displacement of a partial image to any required offset position is realized by the combination of different respective tilt angles of the two glass plates 42 and 44.

As a different optical offsetting device 40 instead of the above-described tiltable glass plates 42 and 44, one could also use a single glass plate (not shown in the drawing) that is inclined relative to the optical axis A and rotatable about an axis that coincides with the optical axis A.

The glass plates 42 and 44 shown in the drawing as well as the above-mentioned single glass plate may also be arranged between the LCD device 16 and the telecentric objective 32 instead of being placed between the telecentric objective 32 and the paper 12.

In the following, the method of operation of the inventive device 10 is explained in greater detail with reference to FIGS. 2 to 4.

If an image is to be produced on the photographic paper 12, the first step is to divide the digital image data into individual partial images. Next, the set of image data for one of the partial images is transferred to the LCD device 16 for addressing the LCD elements 18. The telecentric objective 32 and, as an optional measure, the diaphragm 22 are adjusted in accordance with the specified image format so that the size of each surface element 50 that is to be exposed on the photographic paper 12 in the exposure process of a partial image, corresponds for example to one quarter of the surface area 52 with the dimensions X and Y that will have been exposed after all of the mutually offset partial images have been completed. After the desired color has been set in the filter arrangement 20, the partial image is projected onto the photographic paper 12.

Figure 2:
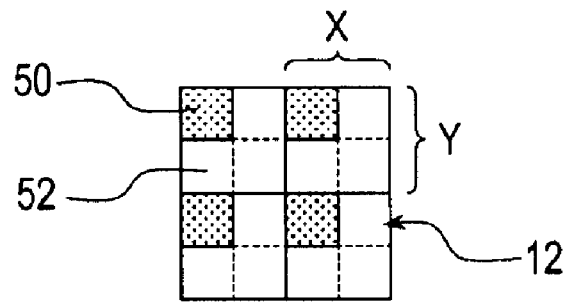
FIG. 2 shows a plan view of a section of the photographic paper with exposed surface elements arranged in a raster grid.
Figure 3:
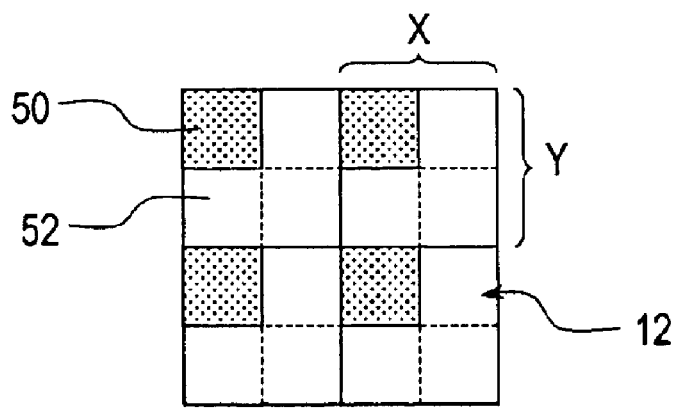
FIG. 3 shows a plan view of a section of the photographic paper on which the raster pitch of the surface elements is enlarged in comparison to the grid in FIG. 2, so that the finished image will have a correspondingly coarser resolution.

FIG. 2 schematically represents a portion of the photographic paper 12 on which four area elements 50 of a partial image have been exposed.

After a partial image has been exposed with one color, a different color may be set in the filter arrangement 20 and another partial image with a different color may be projected onto the same surface elements 50.

After the one or more exposures of the surface elements 50 have been completed, the glass plates 42 and 44 of the optical offsetting device 40 are adjusted, so that a new partial image that is generated by the LCD elements 18 is produced by exposing the surface elements immediately adjacent to the already exposed elements 50. In the case illustrated in FIG. 2, the process of exposing one quadrant of each surface area 52 is repeated four times, until all four quadrants of the surface areas 52 of the photographic paper 12 have been exposed.

With the previously known devices and methods, exposing a large-size format of photographic paper 12 presented the following problem: To produce the larger partial images required for the larger paper formats, the surface segments 50 to be covered by a partial image exposure had to be enlarged commensurately as shown in FIG. 3. Consequently, the image resolution had to be coarser with the larger paper format, meaning that the individual exposure areas 50 are noticeably larger in comparison to the small exposure areas 50 used for a smaller paper format, as may be seen by a comparing FIG. 3 to FIG. 2. At the same time, making the exposure areas 50 larger degraded the sharpness of the transitions between the exposed areas 50 and the surface portions that are not to be exposed. In the most unfavorable case, such poorly defined transitions could even cause the exposed surfaces 50 to overlap each other.

Figure 4:
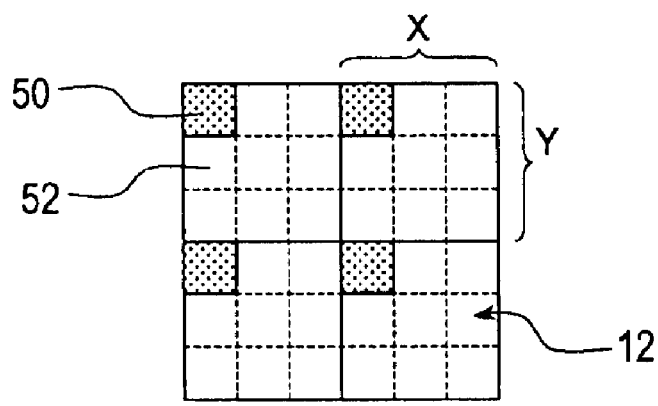
FIG. 4 shows a plan view of a section of the photographic paper, on which the surface elements of the grid have been size-adjusted and shifted by the inventive apparatus in such a manner, that the exposed surface elements have the same size as the elements in FIG. 2, so that in comparison to FIG. 3 the finished image will have a finer resolution.

As illustrated in FIG. 4, to produce an image on a larger paper format, the size of each exposure segment 50 is adjusted in the inventive apparatus 10 through an adjustment of the telecentric objective 32 and/or through an adjustment of the adjustable diaphragm 22, so that the surface elements 50 that are to be exposed for the larger image format have approximately the same dimensions as they had in FIG. 2 for a smaller format of the photographic paper 12. Because the dimensions X and Y of the exposure areas 52 are larger for a bigger image format, the exposure areas 52 are subdivided into a larger number of surface segments 50 to be exposed for producing the image on the photographic paper 12.

In the illustrated examples, the surface section 52 was exposed a total of four times in the case of FIG. 2 and a total of nine times in the case of FIG. 4.

With the inventive apparatus 10 and the inventive method, the size of the exposure segments 50 can now be kept constant irrespective of the enlargement factor, so that a simple solution is offered for producing high-resolution images even on large format sizes of the photographic paper 12.

Instead of the previously described arrangement of a diaphragm 22 and condenser 24, a two-dimensional LED array formed by a plurality of LEDs can be used as light source 14. To attain a particularly high resolution in the finished image, a small size of the exposed surface elements 50 can be set by switching on only a small portion of the LEDs around the center of the LED array. On the other hand, the entire LED array is switched on if the exposed surface elements 50 are to be made larger and the number of exposed surface elements in the finished image is to be decreased. With this arrangement, the adjustable diaphragm 22 described above is unnecessary and can therefore be omitted.

In order to project light beams in different colors onto the light-sensitive material 12, it is also possible to use a multi-colored LED array composed of groups of LEDs that emit light of different respective wavelengths and can be addressed separately to turn on the different colors. With this concept, the filter arrangement 20 is unnecessary. Instead of the multi-colored LED array, it is also possible to use several LED arrays, where each of the arrays emits light of a different wavelength and where the light of the different LED arrays is merged into one light path and directed onto the LCD device by means of optical units.

What is claimed is:

1. An apparatus for producing projected images in different size formats on a light sensitive material, wherein the projected image represents graphic information that is divided into individual pixels, and wherein further the image is projected in the form of partial images that are laterally offset relative to each other, said apparatus comprising:

a transmissive device for producing said partial images, a light source for generating light rays that pass through the transmissive device, an illumination device for guiding the light rays along a plurality of mutually parallel light paths through the transmissive device, and a projection objective for projecting the light rays representing the partial images onto the light-sensitive material, wherein the illumination device bundles the light rays into light beams before they pass through the transmissive device, and the projection objective projects onto the light-sensitive material only those light rays that run at least approximately parallel to the optical axis of the projection objective wherein there is substantially no overlap between adjacent partial images on the light sensitive material.

2. The apparatus of claim 1, wherein the projection objective comprises a telecentric objective.

3. The apparatus of claim 2, wherein the projection objective projects onto the light-sensitive material only those light rays that are within a maximum aperture angle between +7° and −7° relative to the optical axis of the telecentric objective.

4. The apparatus of claim 2, wherein the projection objective projects onto the light-sensitive material only those light rays that are within a maximum aperture angle between +4.7° and −4.7°, relative to the optical axis of the telecentric objective.

5. The apparatus of claim 1 wherein the projection objective comprises at least one of an adjustable objective lens arrangement and an adjustable objective diaphragm arrangement for changing the size of an exposure area of a surface element covered by one of said light beams falling on said light-sensitive material.

6. The apparatus of claim 1, further comprising at least one adjustable illumination diaphragm as well as an illumination lens arrangement disposed between the light source and the transmissive device.

7. The apparatus of claim 1, wherein the illumination lens arrangement comprises a condenser.

8. The apparatus of the claim 1, wherein the illumination device is disposed between the light source and the transmissive device, and wherein the illumination device comprises a micro-lens matrix and a black matrix, said black matrix being interposed between the micro-lens matrix and the transmissive device.

9. The apparatus of claim 1, wherein the projection objective has an optical axis, and wherein the illumination device together with the transmissive device is position-adjustable transversely to said optical axis to effect said lateral offset of said partial images.

10. The apparatus of claim 1, wherein the projection objective has an optical axis, and wherein the apparatus further comprises an optical offsetting device to effect said lateral offset of said partial images transversely to the optical axis, said optical offsetting device being arranged between the projection objective and the light-sensitive material.

11. The apparatus of claim 10, wherein the optical offsetting device comprises a first optical offsetting element tiltable about a first tilt axis and a second optical offsetting element tiltable about a second tilt axis, wherein the first tilt axis and the second tilt axis are oriented at right angles to one another and intersect said optical axis.

12. The device of claim 10, wherein the optical offsetting device comprises a glass plate that is set in an inclined position relative to said optical axis and is rotatable about an axis of rotation coinciding with said optical axis.

13. A method for producing projected images in different size formats on a light sensitive material, wherein the projected image represents graphic information that is divided into individual pixels, and wherein further the image is projected in the form of partial images that are laterally offset relative to each other, said method comprising the steps of:

producing the partial images by means of a transmissive device, generating light rays, guiding the light rays along a plurality of mutually parallel light paths through the transmissive device, wherein the light rays are bundled into light beams before passing through the transmissive device and telecentrically projecting the light rays carrying the partial images onto the light-sensitive material with substantially no overlap between adjacent partial images on the light sensitive material after all of said partial images have been projected onto the light sensitive material.

14. The method of claim 13, wherein the size of an exposure area exposed by one each of said light beams on said light-sensitive material is dependent on the format size of the image on the light-sensitive material.

15. The method of claim 13, wherein the number of partial images projected onto said light sensitive material is selected depending on format size of the image on the light-sensitive material in such a manner that the area one of said light beams on said light-sensitive material remains substantially the same for all of said plurality of format sizes.

16. Apparatus according to claim 1, further comprising means for varying the size of the partial images projected onto said light sensitive material as a function of the format size of the image on the light sensitive material.

17. Apparatus according to claim 16, further comprising means for varying the number of partial images projected onto the light sensitive material as a function of the format size of the image on the light sensitive material, the number of partial images being selected so that the size of the partial images on the light sensitive material remains substantially the same regardless of the image format size.

* * * * *